Figures 9, 10:

No. 887,827. PATENTED MAY 19, 1908.
F. W. MEAKIN.
APPLIANCE FOR USE IN STORING FRESH FRUITS AND OTHER PRODUCE.
APPLICATION FILED AUG. 10, 1907.
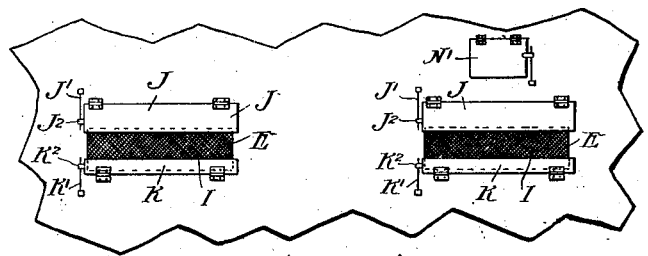
Fig. 1.
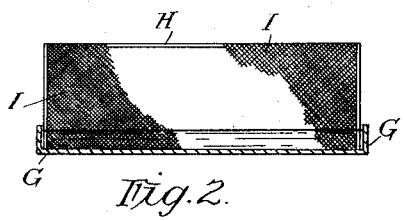
Fig. 2.
Fig. 3.
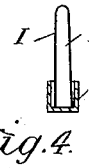
Fig. 4.
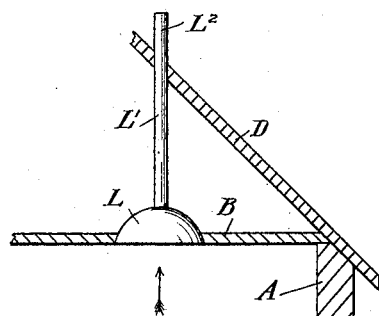
Fig. 5.
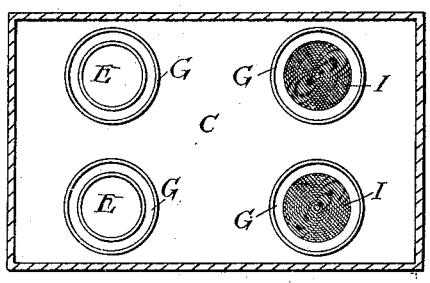
Fig. 6.
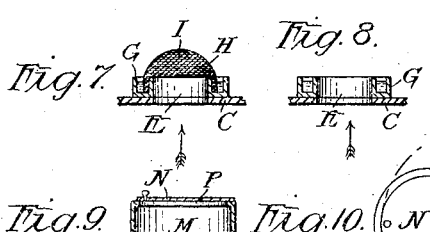
Fig. 7. Fig. 8.

Witnesses
Forrest Roulstone.
E. Batchelder.
Inventor:
F. W. Meakin
By Wright Brown Quinby & May
Attys
THE NORRIS PETERS CO., WASHINGTON, D. C.

UNITED STATES PATENT OFFICE.

FREDERICK WILLIAM MEAKIN, OF NORTH CARLTON, VICTORIA, AUSTRALIA.

APPLIANCE FOR USE IN STORING FRESH FRUITS AND OTHER PRODUCE.

No. 887,827.　　　　Specification of Letters Patent.　　　Patented May 19, 1908.

Application filed August 10, 1907. Serial No. 388,017.

*To all whom it may concern:*

Be it known that I, FREDERICK WILLIAM MEAKIN, a subject of the King of Great Britain, residing at Canning street, North Carlton, in the State of Victoria, Australia, have invented certain new and useful Improvements in Appliances for Use in Storing Fresh Fruits and other Produce; and I do declare the following to be a full, clear, and exact description of the invention, such as will enable others skilled in the art to which it appertains to make and use the same.

This invention has been devised to provide a new or improved method of storing fruit such as apples, pears and the like suitable fruit and in some cases other products which it is desired should be kept fresh for a considerable time and also embodies suitable appliances or apparatus for carrying such method into effect.

The principle of my invention is to obtain and employ a pure, cool, moist atmosphere in which the fruit is to be stored. At present fruit is kept in cold storage chambers at considerable cost or alternatively the fruit is kept in dry storage rooms under ordinary atmospheric conditions. In the former case considerable expense is involved in the employment of freezing machinery for producing and maintaining the frigid air and the fruit is prejudicially affected by the freezing it receives. In the latter case the fruit is found to shrivel up from the effects of the dry air and become unsightly and of less market value.

In order that my invention may be the more easily understood reference may be made to the accompanying drawings, in which—

Figure 1 is a side view of portion of a wall of a building showing a front view of shutters (hereinafter referred to) in a partly open position. Fig. 2 is a view showing the air treating medium in position. Fig. 3 is a plan and Fig. 4 an end view of Fig. 2. Fig. 5 is a sectional elevation of a portion of a building showing various parts of the appliances embodied in my invention. Fig. 6 is a plan view of an alternative arrangement of the appliances for carrying my invention into effect, while Figs. 7, 8, 9 and 10 are sectional views of details of Fig. 6.

Referring to such drawings and the method in which the appliances are used I would say that I employ a closed room constructed of good heat resisting walls A and ceiling B. Such walls can be of brick or stone or of wood-work containing a lining of heat resisting or non-conducting composition or air spaces and preferably of such a nature as will not unduly absorb germs or moisture. The ceiling B may be similarly constructed or lined while the floor C may be constructed of wood or preferably of brick with a cement facing or like suitable material.

In a one-story building a roof as D will be provided of suitable heat resisting material. The fruit is stored either in cases or on shelving in such room and ingress can be obtained thereto by a closely fitting air tight door or doors also preferably constructed of non-conducting material. Around the building I place a number of openings E somewhat resembling openings for windows and in such openings E I place a metal trough G to hold water. Standing in this trough is a framework H over the whole of which, except the ends, is stretched and fastened absorbent porous fabric I. Said fabric may be of cotton or wool or similar suitable material of a porous construction so that the air may pass through same as through a sieve, filter or strainer. The material should be of such an absorbent nature as to induce capillary action when the frame H is stood in the water in the trough G. By experiment I have found an open woolen material such as is used for an under shirt or "jersey" to be suitable for the purpose when lightly stretched upon the frame and secured to the end vertical members. The frame H should completely fill the aperture of the window opening E so that air cannot proceed into the building except through two or more sheets of fabric I composing the inner and outer side of the frame H. Above and below each window opening E I place two hinged flap shutters J and K respectively the upper one J being for the purpose of protecting the framework H from the weather. Each of the shutters is provided with radiating supporting rods $J'$ and $K'$ respectively so that they may be fixed to the proper angle required by locking nuts $J^2$ and $K^2$. The lower flap shutter K is for the purpose of either completely closing the outside of the opening E or adjusting the amount of air which may come to the frame-work H. In the ceiling B I place a number of uptake or eduction funnels L leading by pipes as $L'$ to outside the building. If necessary an educt cowl may be placed on each of the pipes at $L^2$ to further assist the draft from the interior of the room. In practice the door of the room being closed and the shutters J and K being adjusted as required, and the trough G being filled with water, the fabric I on the frame H sucks up moisture in a finely distributed condition over the whole of its surface. The draft caused by the funnel L and exit pipe L' draws the air from out the room and in order to make good such displacement the air from the exterior of the building percolates or enters through the moistened strainer fabric I into the room leaving behind it all dust and undesirable germs in the said fabric I. The air is also thus cooled below ordinary atmospheric conditions and having been moistened in its passage through the said fabric I does not tend to rob the fruit or other produce of its natural juices or moisture as would be the case if plain dry air entered into such room. Thus the fruit, for instance, does not become dried or shriveled on its external surfaces and I have found by experiment it will keep in such room, under the conditions I have described, for a very considerable period.

The upper portion of the walls A are provided with a number of openings M' and corresponding shutters N' having adjustable brace rods N² in pivotal engagement therewith for holding the same in the desired open position. The object of these openings is to allow the moist air, for instance on a cold still night, to enter the chamber and circulate therein and eject any accumulation of impure air that might have taken place. Care should, however, be taken that the outside temperature is above freezing point before opening the shutters N'.

Owing to the fact that the lower openings have means for moistening the air passing through them, and that there are upper openings having regulating shutters, an automatic or natural circulation of air is obtained, especially in view of the fact that the walls of the compartment are non-heat conducting. And owing to the fact that the shutters of both the upper and lower openings are pivoted on horizontal axes so that they may be swung vertically and set in position, currents of air passing through the openings and through the compartment are less affected by wind than if said shutters were pivoted on vertical axes. When shutters swing outward on vertical axes they are liable to catch wind to a great extent at times, while if the wind changes and blows in the opposite direction the shutters will catch no wind at all.

I would have it understood that the water troughs G may be placed in connection with any simple system of feed pipes leading from a tank or other water supply so that they may be refilled from time to time as required, say every morning in dry weather. Such water system may be controlled in its supply at each individual trough G by any simple float appliance which will turn on the water when said float sinks. I would also have it understood that I may in certain cases place a little oxygenizing chemical such as permanganate of potassium in these troughs should the air in the room become in any way impure, owing to the fruit or produce stored therein.

In lieu of the openings E or in addition thereto I may arrange that the air may enter at the floor level of the building, in which latter case an arrangement such as is shown in Fig. 6 may be employed and in which the fabric I may be stretched over frames preferably circular as in Fig. 7, in which case the framework H may stand in a circular trough G (see Fig. 8) and the air enter in the manner shown by arrows. Any simple form of cap such as M shown in Fig. 9 can be used to wholly or partly close the ingress of air into the room (see Fig. 10) wherein a top sliding circular plate N can control the opening in the lip P.

I desire to also have it understood that where my invention is employed on board ship for instance, I would employ a draft fan or similar exhaust apparatus in attachment with the pipes L' should the arrangements on board ship not be sufficiently convenient for the employment of the funnel, the pipe L and educt cowl L².

I do not confine myself to any particular number or size of the window openings E nor to the number of sheets of fabric, nor to the thickness of the frame work H as the same must of necessity be adjustably sized to suit the particular climate in which my invention is to be employed.

Although I have described the application of my invention to the storing of fruits such as apples, pears and the like it is obvious that other produce such as dairy produce may be kept in the room with advantage when the latter is not being employed with fruit.

I claim—

1. An appliance for the storage of fresh fruits and other produce, comprising a compartment having non-heat conducting walls said walls having upper and lower openings provided with regulating shutters pivoted on horizontal axes and having means whereby they may be adjustably secured at the desired vertical angles, the lower openings having means for moistening the air passing through under natural draft.

2. An appliance for the storage of fresh fruits and other produce, comprising a compartment having non-heat conducting walls said walls having upper and lower openings provided with regulating shutters pivoted on horizontal axes and having means whereby they may be adjustably secured at the desired vertical angles, the lower openings having troughs for containing water, and a frame work for supporting porous material with its lower edges in the troughs.

3. An appliance for the storage of fresh fruits and other produce, comprising a compartment having non-heat conducting walls said walls having upper and lower openings provided with regulating shutters pivoted on horizontal axes and having means whereby they may be adjustably secured at the desired vertical angles, the lower openings having troughs for containing water, and a frame work for supporting porous material with its lower edges in the troughs, and an eduction funnel or ventilator for permitting escape of air from a point above the level of the upper openings in the walls.

In testimony whereof I have signed my name to this specification in the presence of two subscribing witnesses.

FREDERICK WILLIAM MEAKIN.

Witnesses:
ALICE HARKER,
FLORENCE SINCLAIR.